US011413594B1

(12) United States Patent
Abulkhair et al.

(10) Patent No.: US 11,413,594 B1
(45) Date of Patent: Aug. 16, 2022

(54) VISCOUS FLUID REACTION APPARATUS

(71) Applicant: King Abdulaziz University, Jeddah (SA)

(72) Inventors: Hani Abdulelah Abulkhair, Jeddah (SA); Iqbal Ahmed Moujdin, Jeddah (SA); Faridah Bt Kormin, Parit Raja (MY); Hussam Adnan Organji, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/549,074

(22) Filed: Dec. 13, 2021

(51) Int. Cl.
*B01J 19/00* (2006.01)
*B01J 19/18* (2006.01)
*B01F 27/05* (2022.01)
*B01F 23/233* (2022.01)

(52) U.S. Cl.
CPC ........ *B01J 19/0066* (2013.01); *B01J 19/18* (2013.01); *B01F 23/233* (2022.01); *B01F 27/05* (2022.01)

(58) Field of Classification Search
CPC ...... B01J 19/0066; B01J 19/18; B01F 23/233; B01F 27/05
USPC ....................................................... 422/135
See application file for complete search history.

(56) References Cited

U.S. PATENT DOCUMENTS

| | | |
|---|---|---|
| 1,504,867 A | 8/1924 | Cannon |
| 4,004,786 A | 1/1977 | Stephens |
| 4,032,118 A * | 6/1977 | Phillips ................ F16J 15/3208 384/142 |
| 4,457,628 A | 9/1984 | Kataishi et al. |
| 5,098,669 A | 3/1992 | Kawanami et al. |
| 6,244,741 B1 | 6/2001 | Akamine et al. |
| 10,213,759 B2 | 2/2019 | Byström et al. |

(Continued)

FOREIGN PATENT DOCUMENTS

| | | |
|---|---|---|
| CN | 201357070 Y | 12/2009 |
| CN | 206996569 U | 2/2018 |

(Continued)

OTHER PUBLICATIONS

Machine translation of JP-2008104930A—Microwave reactor (Year: 2022).*

*Primary Examiner* — Huy Tram Nguyen
(74) *Attorney, Agent, or Firm* — Oblon, McClelland, Maier & Neustadt, L.L.P.

(57) ABSTRACT

A viscous fluid reaction apparatus is described. The viscous fluid reaction apparatus comprises a glass reaction vessel. The viscous fluid reaction apparatus further comprises a gas-tight inlet assembly and a gas-tight stirrer assembly. The gas-tight stirrer assembly comprises a stirrer opening adapter, a stirrer coupling comprising a stirrer shaft seal connected to the stirrer opening adapter, a stirrer shaft comprising one or more stirrer blades located at a blade end of the stirrer shaft, and a motor coupling connected to the stirrer shaft. The viscous fluid reaction apparatus further comprises a motor connected to the motor coupling. The stirrer shaft passes through the stirrer coupling and the stirrer opening adapter such that the stirrer blade(s) are disposed in the glass reaction vessel at a blade height and the stirrer shaft is configured to rotate without compromising a gas-tight seal formed by the stirrer shaft seal.

17 Claims, 8 Drawing Sheets

(56) References Cited

U.S. PATENT DOCUMENTS

| | | | |
|---|---|---|---|
| 2008/0264934 A1* | 10/2008 | Moreira | ................ B01J 19/126 |
| | | | 219/757 |
| 2010/0010675 A1 | 1/2010 | Anderberg | |
| 2015/0144480 A1* | 5/2015 | Zhao | ..................... B01J 19/243 |
| | | | 422/128 |
| 2017/0130729 A1* | 5/2017 | Getto | .................. F04D 29/0462 |
| 2020/0165558 A1 | 5/2020 | Shevitz | |

FOREIGN PATENT DOCUMENTS

| | | |
|---|---|---|
| EP | 0 232 428 A1 | 8/1987 |
| JP | 2008104930 A * | 5/2008 |
| KR | 10-1936052 B1 | 1/2019 |

* cited by examiner

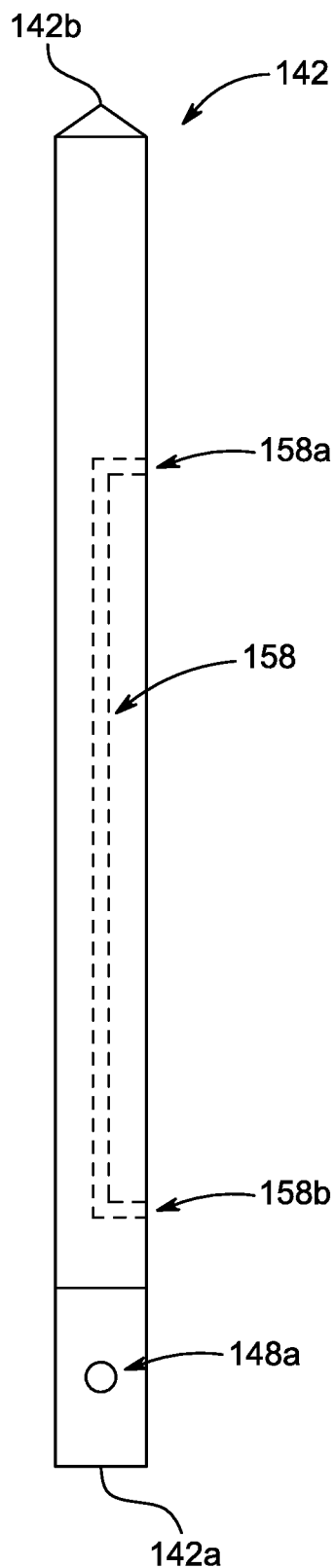
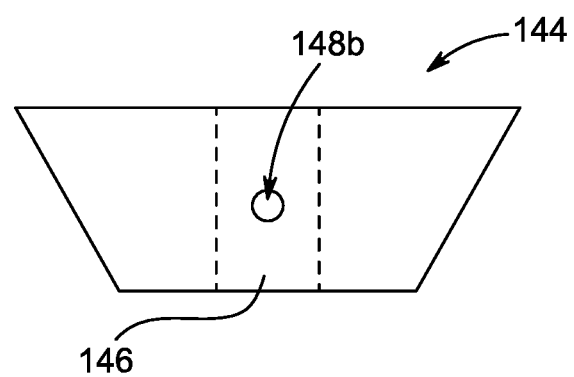
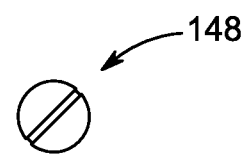
FIG. 5B
FIG. 5C
FIG. 5A

VISCOUS FLUID REACTION APPARATUS

BACKGROUND

Technical Field

The present disclosure is directed to stirring devices used for performing mixing operations, and more particularly to a viscous fluid reaction apparatus which provides efficient mixing operations for dissolution of viscous solvents-solutes materials.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mixing of liquids or dissolution of solids in appropriate solvent is widely used in practically all phases of chemical processing as well as in scientific instrumentation. There are countless instances in industrial chemical processes in which reactants are mixed in large-scale stirred chemical reactors. Further, on a smaller scale, e.g., in scientific instrumentation, there are many applications that involve a fluid mixing operation, such as measurement in glassware apparatus for solute-solvents equilibrium for kinetics measurements. Moreover, numerous analytical procedures require the mixing of reagents and reactants in a controlled, closed environment to complete a chemical measurement. Such mixing is more than simple agitation. Great care and huge effort goes into optimizing factors such as heat generation/dissipation, blend times, and power consumption. Mixing which is too rapid may result in runaway reaction rates which can generate large amounts of heat or volume changes dangerous for chemical facilities and personnel. Mixing which is too slow can cause solidification within a reactor.

Stirring devices are generally employed for processes, such as mixing, dissolving, dispersing and blending in chemical industry, pharmaceutical industry, food industry and the like. The stirring devices are utilized to provide dissolution or mixing of materials, particularly of medium or high viscous fluids, such as the mixing of the individual constituents of a liquid-liquid, solid-liquid and liquid-gas, respectively. Traditionally, the stirring devices are made of steel or quartz glass. Sealed stirring devices provide convenient and efficient blending of materials without creating ambient air entertainment into the blended liquid. This is especially applicable for fluid mixing operations done in the laboratory.

Sometimes solvent-solute mixing or dissolution must be performed under increased pressure, reduced pressure, in a specific atmosphere, or at high temperature in a closed space, for example in a reaction chamber, an autoclave, a rubber vulcanizer, an electric furnace, a heat treatment furnace, a culture chamber, or the like. There are other applications in which the dissolution of a solid phase (polar, non-polar engineered polymers, salts halides) with a liquid (polar, dipolar solvents) is specifically desired. Examples of these applications include mixing in two-phase reaction vessels and in apparatus to measure solid-liquid equilibrium. Many of these applications require microwave-based closed heating which may be difficult or impossible to achieve with traditional stainless steel or magnetic stirrers, as such traditional stirrers are not designed to work inside microwave. Furthermore, some applications purposely have need of both the mixing of the liquid and the entrainment of some inert gases or the like into the liquid, which may not be possible with traditional mechanical stirrers.

EP0232428A1 discloses a fluid stirrer in which a power unit and a bearing unit are provided in a sealed space, to agitate the fluid in the space without permitting it to leak out of the equipment. U.S. Pat. No. 4,004,786A discloses a stirring device for mixing liquid and dry ingredients in a tank, and employs an agitator prop having claws or fingers formed thereon to break up balls of dry ingredients, a shear plate to strain and shear ingredients forced therethrough. U.S. Pat. No. 6,244,741B1 discloses a stirring device which includes a vertical cylindrical stirring vessel, a rotary shaft vertically extended within the stirring vessel for rotation, and a stirring vessel constituted of two or more basically rectangular vane plates vertically supported on the rotary shaft in symmetrical relation with each other with respect to the rotary shaft, to achieve high stirring efficiency and easy to wash and maintain. US20100010675A1 discloses an apparatus for mixing a viscous flowable medium which includes a receptacle for receiving the viscous flowable medium and has a substantially vertically arranged rotatable stirring axle and a stirring assembly that comprises at least one stirring element.

Each of the aforementioned references suffers from one or more drawbacks hindering their adoption. For instance, the above-mentioned references may not be suitable for microwave-based closed heating system. Also, none of the above-mentioned references seems to provide any mechanism to introduce inert gas or the like for the fluid being mixed. Further, the above-mentioned references may need to operate with high power agitating motors due to their generally heavy weight and may be difficult to clean because of fluid sealed bearings.

Accordingly, it is an object of the present disclosure to provide a viscous fluid reaction apparatus suitable for microwave-based closed heating system, which may be capable of both acid and alkali solvents-solutes mixing either for viscous or non-viscous materials, which may have a high stirring efficiency at low or high rotation speed for low power consumption, and which may further be easily washed and maintained.

SUMMARY

In an exemplary embodiment, a viscous fluid reaction apparatus is described. The viscous fluid reaction apparatus comprises a glass reaction vessel comprising an inlet, an outlet, and a stirrer opening. The viscous fluid reaction apparatus further comprises a gas-tight inlet assembly disposed in the inlet. The viscous fluid reaction apparatus further comprises a gas-tight stirrer assembly, a portion of which is disposed in the stirrer opening. The gas-tight stirrer assembly comprises a stirrer opening adapter disposed in and configured to interface with the stirrer opening. The gas-tight stirrer assembly further comprises a stirrer coupling comprising a stirrer shaft seal connected to the stirrer opening adapter. The gas-tight stirrer assembly further comprises a stirrer shaft comprising one or more stirrer blades located at a blade end of the stirrer shaft. The gas-tight stirrer assembly further comprises a motor coupling connected to the stirrer shaft. The viscous fluid reaction apparatus further comprises a motor connected to the motor coupling. The stirrer shaft passes through the stirrer coupling and the stirrer opening adapter such that the stirrer blade(s) are disposed in the glass reaction vessel at a blade height and the stirrer shaft is configured to rotate about a stirrer shaft axis being driven by the motor without compromising a gas-tight seal formed by the stirrer shaft seal.

In some embodiments, the glass reaction vessel is borosilicate glass or quartz.

In some embodiments, the glass reaction vessel comprises a reaction vessel body, a reaction vessel lid, and optionally comprising a reaction vessel gasket disposed between the reaction vessel body and the reaction vessel lid.

In some embodiments, the viscous fluid reaction apparatus is defined by a microwave reaction zone which is substantially free of metal components.

In some embodiments, the microwave reaction zone is devoid of metal components.

In some embodiments, the stirrer shaft and the one or more stirrer blades are constructed of a polymer.

In some embodiments, the polymer is polytetrafluoroethylene.

In some embodiments, the stirrer shaft seal comprises one or more perfluoroeslatomer O-rings.

In some embodiments, the stirrer opening adapter comprises protuberances defined from a periphery of the stirrer opening adapter and projecting at a protuberance angle inward toward the stirrer shaft and downward toward the stirrer blade(s).

In some embodiments, the stirrer coupling is a slide coupling configured to allow adjustment of the blade height.

In some embodiments, the viscous fluid reaction apparatus further comprises an inert gas inlet connected to the gas-tight inlet assembly.

In some embodiments, the viscous fluid reaction apparatus further comprises a temperature probe which is configured to pass through the gas-tight inlet assembly such that the temperature probe measures the temperature of a viscous fluid contained within the viscous fluid reaction apparatus.

In some embodiments, the motor is configured to turn the stirrer shaft at a rotation rate of 0 to 2500 rpm.

In some embodiments, the viscous fluid reaction apparatus is configured to withstand a pressure differential of up to 5 bar compared to ambient atmospheric pressure.

In some embodiments, the stirrer coupling defines an annular space about a portion of the stirrer shaft proximal to a coupling end of the stirrer shaft, the annular space comprising an annular space seal which is gas-tight and which allows the stirrer shaft to rotate.

In some embodiments, the annular space seal comprises one or more perfluoroeslatomer O-rings.

In some embodiments, the stirrer coupling further comprises a purge gas inlet configured to provide a purge gas to the annular space.

In some embodiments, the stirrer shaft comprises a purge gas pathway comprising a stirrer shaft gas inlet located at the portion of the stirrer shaft proximal to a coupling end of the stirrer shaft which is located within the annular space and a stirrer shaft gas outlet located proximal to the blade end of the stirrer shaft.

In some embodiments, the viscous fluid reaction apparatus further comprises a microwave heater which is configured to provide microwave radiation to the microwave reaction zone without providing substantial microwave radiation to another portion of the viscous fluid reaction apparatus.

In some embodiments, the viscous fluid reaction apparatus is capable of stirring a fluid contained within the apparatus having a viscosity of 0.01 to 10,000 cP at a rate of 0 to 2500 rpm.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 5A is a planar view of a shaft of the stirrer shaft of FIG. 4, according to certain embodiments.

FIG. 5B is a planar view of stirrer blades of the stirrer shaft of FIG. 4, according to certain embodiments.

FIG. 5C is a planar view of a fastener of the stirrer shaft of FIG. 4, according to certain embodiments.

DETAILED DESCRIPTION

Figure 1:
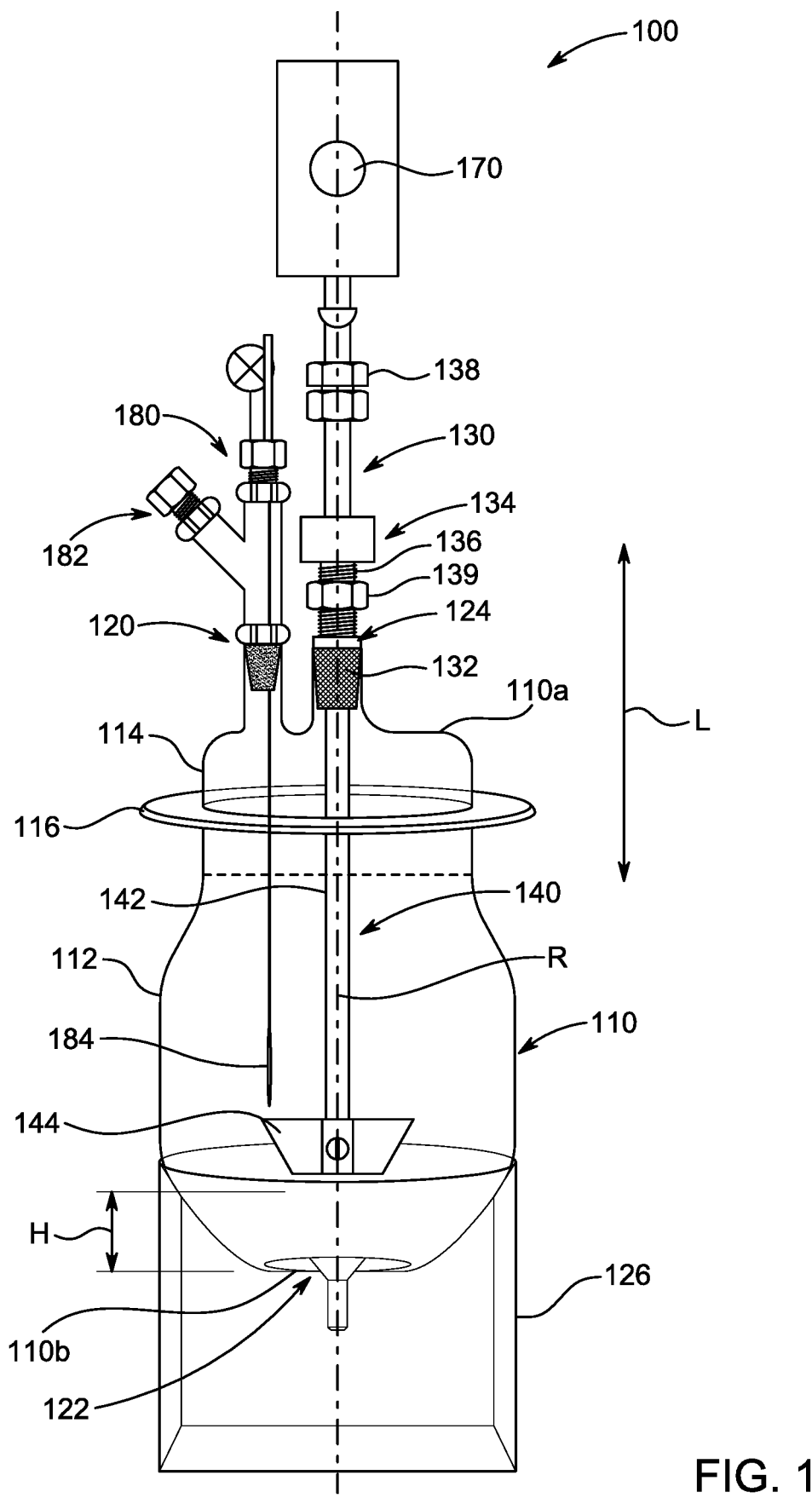
FIG. 1 is an assembled view of a viscous fluid reaction apparatus, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, preferably 10%, preferably 5%, and any values therebetween.

Aspects of this disclosure are directed to a viscous fluid reaction apparatus which is defined by a microwave reaction zone substantially free of metal components, or preferably completely devoid of metal components, to make it suitable for microwave-based closed heating system. The viscous fluid reaction apparatus of the present disclosure also allows for microwave heating of reactants under an inert atmosphere with stirring. Further, a mixture may be blended or stirred while purging with inert gas without creating ambient air entertainment into the blended mixture. These aspects in particular may be advantageous for carrying out reactions involving highly viscous liquids and reactants that are especially sensitive to atmospheric moisture. Due to its design and configuration, the present viscous fluid reaction apparatus further allows for dissolution and blending of materials for both acid and alkali solvent or solution, and has a high stirring efficiency at low-high rotation speed with low power consumption, and further be easily washed and maintained.

Referring to FIG. 1, an assembled view of a viscous fluid reaction apparatus 100 is illustrated according to an embodiment of the current disclosure. The viscous fluid reaction apparatus 100 of the present disclosure is implemented as a stirring device for mixing or dissolution of reagents, at least one of which may be a fluid (e.g. solvents-solutes). In process engineering, mixing is an operation that involves manipulation of a heterogeneous physical system with the intent to make it more homogeneous. The term "viscous fluid reaction apparatus" as used herein is meant to include all devices creating a circular, rotary, vortical, or similar movement for efficient mixing. The type of operation and equipment used during mixing depends on the state of materials being mixed (liquid, semi-solid, or solid) and the miscibility of the materials being processed. The fluid may be classified based on various physical properties, such as the compressibility, the relationship between the apparent viscosity and the shear stress, or the time-dependent viscosity. The fluid may be compressible or incompressible. The fluid may have a constant viscosity which does not change with shear stress. In such a fluid, the shear stress is directly proportional to the velocity gradient (i.e. the fluid follows Newton's Law of Viscosity). Such a fluid may be referred to as a Newtonian fluid. The fluid may also be a non-Newtonian fluid. Non-Newtonian fluids are fluids which do not follow Newton's Law of Viscosity. Non-Newtonian fluids may be sheer-thickening (dilatant) in which the apparent viscosity increases with the rate of shear strain or may be shear-thinning (pseudoplastic) in which the apparent viscosity decreases with the rate of shear strain. Examples of shear-thinning fluids include, but are not limited to nail polish, whipped cream, ketchup, molasses, syrups, mixtures of paper pulp in water, latex paint, ice, blood, certain silicone oils, and certain silicone coatings. Examples of shear-thickening fluids include mixtures of cornstarch in water, mixtures of silica in polyethylene glycol, and mixtures of sand and water such as quicksand. The fluid may also be a Bingham plastic, a fluid which does not flow until a critical stress is applied, beyond which it flows. The flow characteristics of the Bingham plastic beyond the critical stress may be Newtonian or Non-Newtonian. Examples of Bingham plastics include mayonnaise, toothpaste, and ketchup. The fluid may be described by the time-dependent behavior of the viscosity. The fluid may be rheopectic, having an apparent viscosity which increases with the duration of the stress or may be thixotropic, having an apparent viscosity which decreases with the duration of the stress. Examples of rheopectic fluids include, but are not limited to synovial fluid, printer ink, and gypsum paste. Examples of thixotropic fluids include, but are not limited to yogurt, peanut butter, xanthan gum solutions, aqueous iron oxide gels, gelatin gels, pectin gels, hydrogenated castor oil, some clays (including bentonite, and montmorillonite), and paints.

The viscous fluid reaction apparatus 100 is configured to be implemented for solvents-solutes mixing either for viscous or non-viscous materials. The viscous fluid reaction apparatus 100 may be a freestanding handheld or otherwise portable device, and may be a component built into or attached externally to a single dispensing head or multiple dispensing heads of an automated or semi-automated dispenser system.

As shown in FIG. 1, the viscous fluid reaction apparatus 100 includes a glass reaction vessel 110. The glass reaction vessel 110 has a top end 110a and a bottom end 110b. In the illustrated example, the glass reaction vessel 110 is shown to have a generally cylindrical configuration of uniform cross-section for at least a portion of its height extending from the bottom end 110b towards the top end 110a, and may optionally be constricted towards the top end 110a to have a relatively smaller diameter thereat. In other examples, the glass reaction vessel 110 may have some other suitable shape, such as cylindrical configuration of uniform cross-section throughout its entire height or frustum-conical shape as commonly used for such vessels without any limitations.

In general, the glass reaction vessel 110 may be constructed of any suitable glass. The glass may be characterized by the chemical composition. Examples of types of glass include, but are not limited to soda lime glass, borosilicate glass, aluminosilicate glass, lead glass. In an embodiment of the present disclosure, the glass reaction vessel 110 is borosilicate glass or quartz. That is, the glass reaction vessel 110 is made of borosilicate glass or quartz material. Such material configuration allows for the glass reaction vessel 110 to be implemented for microwave-based closed heating system. The use of quartz or borosilicate glass may be advantageous over other types of glass such as soda lime glass. The advantages may be due to certain material properties of borosilicate glass and/or quartz glass, such as the lower coefficient of thermal expansion or resistance to thermal shock, compared to other types of glass such as soda lime glass. The glass may also be characterized by treatments or additives which are intended to change the physical properties of the glass. Examples of such glasses include annealed glass, tempered glass, chemically strengthened glass, and laminated glass. The glass, however, should not be wire mesh glass, which has a mesh of metal wires embedded. Such metal wires are incompatible with the microwave heating of the present disclosure. In general, the glass may be colorless or have a color. The glass may be optically transparent or may have an additive or coating which reduces a transmissivity of the glass in the visible region, the infrared region, and/or the ultraviolet region of the electromagnetic spectrum.

In an embodiment of the present disclosure, as illustrated, the glass reaction vessel 110 includes a reaction vessel body 112 and a reaction vessel lid 114. The reaction vessel body 112 generally forms a lower portion of the glass reaction vessel 110, with the reaction vessel lid 114 being seated on a periphery of the reaction vessel body 112 in the glass reaction vessel 110. It may be appreciated that both the reaction vessel body 112 and the reaction vessel lid 114 may be made of borosilicate glass or quartz material, as described above. The glass reaction vessel 110 further optionally includes a reaction vessel gasket 116 disposed between the reaction vessel body 112 and the reaction vessel lid 114. The reaction vessel gasket 116 ensures a seal between the reaction vessel body 112 and the reaction vessel lid 114, and thus makes the glass reaction vessel 110 leak-proof for performing the mixing operation or the like. In one or more examples, the reaction vessel gasket 116 may be made of a rubber material, a fiber material, a foam material, a silicone material, a perfluoroeslatomer material, a cork or cork blend, or the like. Examples of rubber materials commonly used in gaskets include but are not limited to butyl rubber, clothinserted rubber, ethylene propylene diene monomer (EPDM) rubber, latex rubber, natural (gum) rubber, Neoprene®, nitrile rubber, styrene-butadiene rubber (SBR), polyurethane rubber, and thermoplastic rubber. Examples of fiber materials commonly used in gaskets include, but are not limited to vegetable fiber, cellulose, felt, cellulose/synthetic rubber, cellulose/nitrile rubber, aramid fiber, Fiber-Kork®, Nomex®, Velbuna®, Vellutherm®, Bucote®, Nicote®, Cellulose Accopac®, and Synthseal®. Examples of foam materials commonly used in gaskets include vinyl foam, Ensolite® foam, Poron® foam, Volara®, cross-linked polyethylene foam, polystyrene foam, polyethylene foam, polyurethane foam, and ethylene vinyl acetate (EVA) foam. The foam may be closed-cell or open-cell. Examples of silicone materials commonly used in gaskets include, but are not limited to food-grade silicone, fluorosilicone, conductive silicone, fiberglass reinforced silicone, medical-grade silicone, and silicone sponge. Examples of perfluoroelastomer materials commonly used in gaskets include, but are not limited to polytetrafluoroethylene, GPlast®, Kalrez®, Perlast®, and Chemraz®. The reaction vessel gasket 116 may form or help form a fluid-tight seal to make the glass reaction vessel 110 suitable to be implemented for microwave-based closed heating system. Such design allows for easy disassembly of the glass reaction vessel 110, thereby providing convenient access to inside of the reaction vessel body 112, and thus making it convenient for washing and maintaining the glass reaction vessel 110 which may be subjected to various types of materials during mixing operations.

Further, as illustrated, the glass reaction vessel 110 includes an inlet 120, an outlet 122, and a stirrer opening 124. In general, the inlet 120, the outlet 122 and the stirrer opening 124 may be in the form of openings defined in the glass reaction vessel 110. As may be seen in the exemplary embodiment depicted in FIG. 1, the inlet 120 and the stirrer opening 124 may be defined in the top end 110a of the glass reaction vessel 110, and the outlet 122 may be defined in the bottom end 110b of the glass reaction vessel 110. In some embodiments, the inlet 120 and the stirrer opening 124, may be defined in the glass reaction vessel 110 at a location proximal to, but not located at the top end 110a of the glass reaction vessel 110. In some embodiments in which the glass reaction vessel 110 includes a reaction vessel body 112 and a reaction vessel lid 114, the inlet 120 and the stirrer opening 124 may be defined in the reaction vessel lid 114 of the glass reaction vessel 110, and the outlet 122 in the reaction vessel body 112 of the glass reaction vessel 110. In some embodiments in which the glass reaction vessel 110 includes a reaction vessel body 112 and a reaction vessel lid 114, the inlet 120 and the stirrer opening 124 may be defined in the reaction vessel body 112 of the glass reaction vessel 110. In an example, as shown, a container 126 may be placed below the glass reaction vessel 110 with the outlet 122 disposed in the container 126, such that any blended mixture may be extracted from the glass reaction vessel 110 under gravity via the outlet 122 into the container 126.

Further, as illustrated, the glass reaction vessel 110 includes a gas-tight stirrer assembly 130. The gas-tight stirrer assembly 130 may be supported in the glass reaction vessel 110 at the stirrer opening 124. As shown, a portion of the gas-tight stirrer assembly 130 is disposed in the stirrer opening 124. Further, as shown in the exemplary embodiment depicted in FIG. 1, another portion (a lower portion) of the gas-tight stirrer assembly 130 may extend into the glass reaction vessel 110, or into the reaction vessel body 112 through the reaction vessel lid 114; and yet another portion (an upper portion) of the gas-tight stirrer assembly 130 may be extending outside of the glass reaction vessel 110. In the glass reaction vessel 110, the gas-tight stirrer assembly 130 is responsible for mixing of the solvent-solute mixture inside the reaction vessel body 112, as will be discussed in more detail below.

Figure 2:
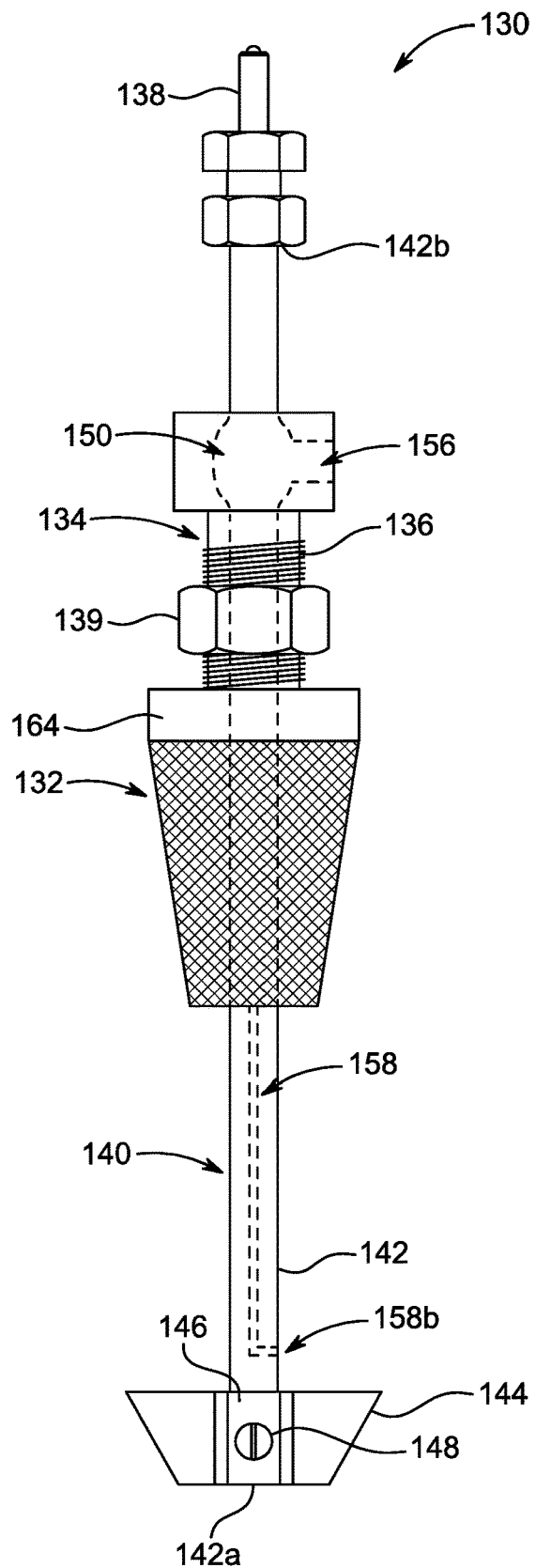
FIG. 2 is an assembled view of a gas-tight stirrer assembly of the viscous fluid reaction apparatus of FIG. 1, according to certain embodiments.
Figure 3:
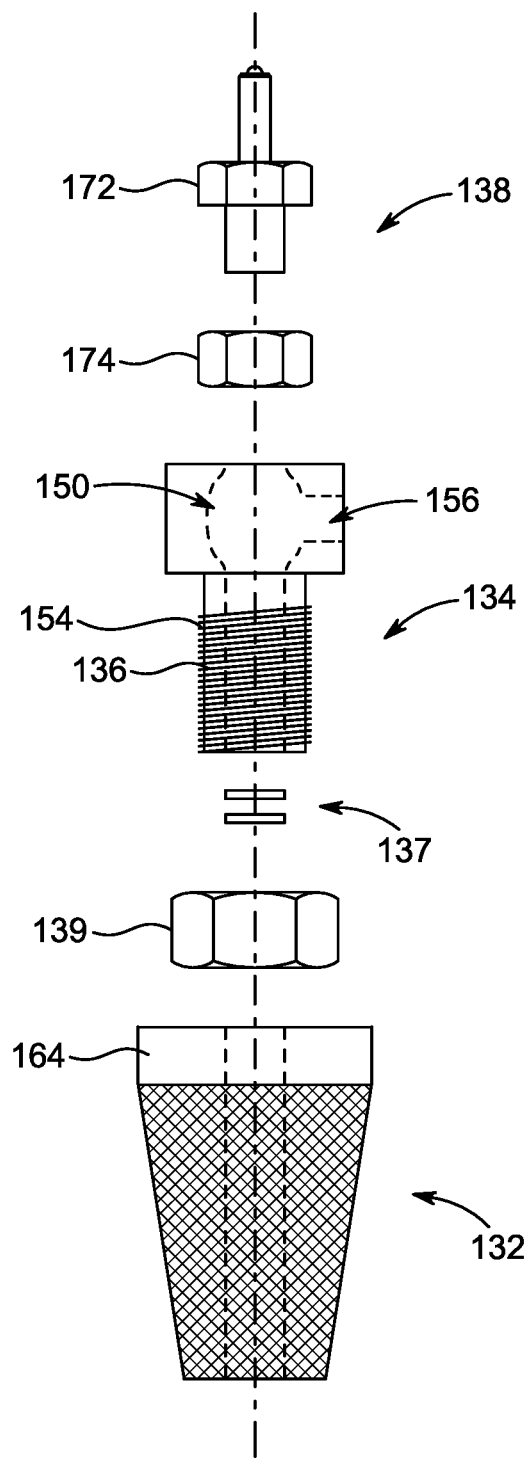
FIG. 3 is a partial exploded view of the gas-tight stirrer assembly of FIG. 2 without a stirrer shaft thereof, according to certain embodiments.

FIG. 2 illustrates an assembled view of the gas-tight stirrer assembly 130 and FIG. 3 illustrates a partial exploded view of the gas-tight stirrer assembly 130, according to an embodiment of the present disclosure. Referring to FIGS. 2-3 in combination with FIG. 1, as illustrated, the gas-tight stirrer assembly 130 incudes a stirrer opening adapter 132. The stirrer opening adapter 132 is disposed in and configured to interface with the stirrer opening 124 of the glass reaction vessel 110, such that the gas-tight stirrer assembly 130 may be supported in the glass reaction vessel 110. The stirrer opening adapter 132 may provide a gas-tight fit between the gas-tight stirrer assembly 130 and the glass reaction vessel 110. The gas-tight stirrer assembly 130 further incudes a stirrer coupling 134. The stirrer coupling 134 includes a stirrer shaft seal 136 connected to the stirrer opening adapter 132. The stirrer shaft seal 136 may be in the form of a cylindrical extension of the stirrer coupling 134. In an aspect of the present disclosure, as better illustrated in FIG. 3, the stirrer shaft seal 136 may include one or more stirrer shaft seal gaskets. The stirrer shaft seal gaskets may be made of a suitable gasket material as described above. In some embodiments, the stirrer shaft seal gaskets are in the form of O-rings 137 (as shown in FIG. 3). Preferably, the O-rings 137 are made of a perfluoroelastomer. Such O-rings may be referred to as perfluoroelastomer O-rings. With use of the one or more perfluoroeslatomer O-rings 137, the stirrer shaft seal 136 ensures gas-tight connection between the stirrer coupling 134 and the stirrer opening adapter 132. This stirrer shaft seal may allow the stirrer shaft and stirrer coupling to rotate within the stirrer opening adapter while maintaining a gas-tight connection. Also, as illustrated, the stirrer coupling 134 includes a connecting member 139, in the form of a nut or the like, to engage the stirrer coupling 134 with the stirrer opening adapter 132. Further, as illustrated, the gas-tight stirrer assembly 130 incudes a motor coupling 138 and a stirrer shaft 140, with the motor coupling 138 connected to the stirrer shaft 140, as will be discussed in more detail later in the description.

Figure 4:
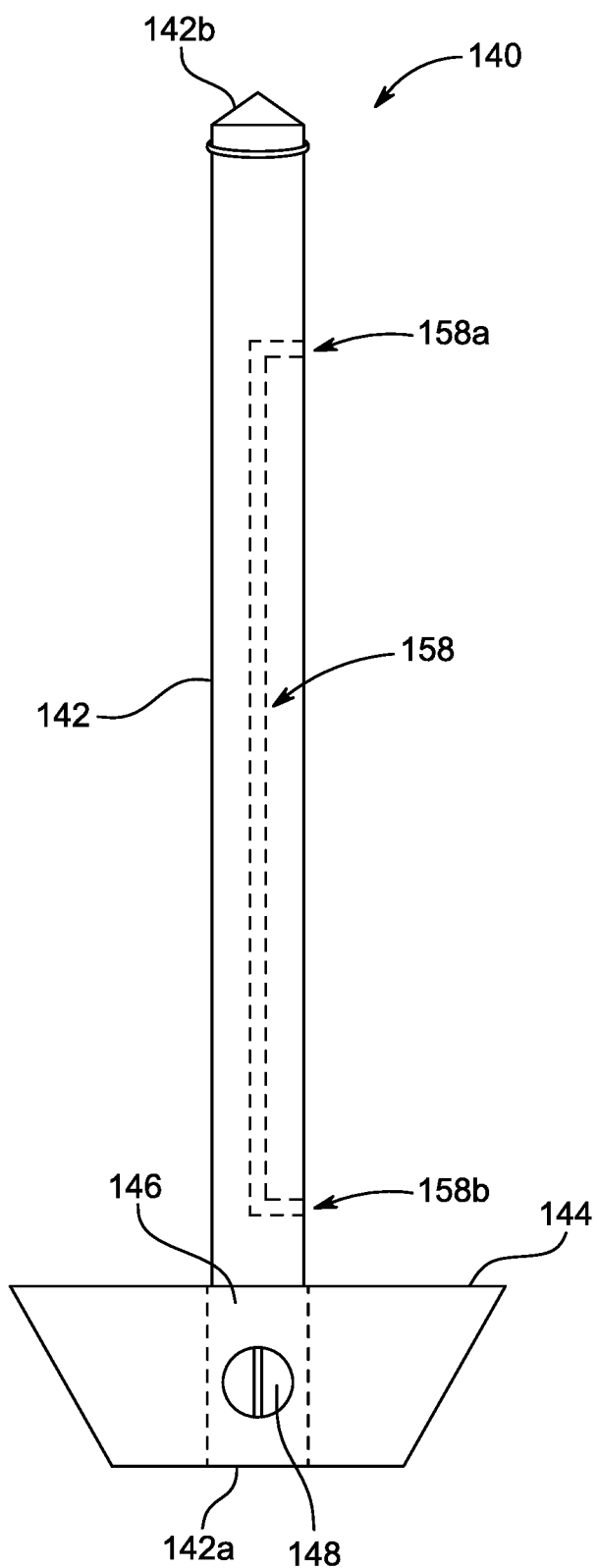
FIG. 4 is an assembled view of the stirrer shaft, according to certain embodiments.

FIG. 4 illustrates an assembled view of the stirrer shaft 140. Further, FIGS. 5A-5C illustrate detailed views of different components of the stirrer shaft 140, as described hereinafter. Referring to FIGS. 1-4 and also FIGS. 5A-5C in combination, as illustrated, the stirrer shaft 140 passes through the stirrer coupling 134 and the stirrer opening adapter 132. In particular, the stirrer shaft 140 may include a shaft 142 (as independently shown in FIG. 5A). The shaft 142 may be in the form of a cylindrical member passing through the stirrer coupling 134 and the stirrer opening adapter 132. The stirrer shaft 140 has a blade end 142a which corresponds to a lower end of the shaft 142 thereof and a coupling end 142b which corresponds to an upper end of the shaft 142 thereof. The stirrer shaft 140 is disposed along a longitudinal axis 1' in the viscous fluid reaction apparatus 100 as part of the gas-tight stirrer assembly 130 (as shown in FIG. 1).

The stirrer shaft 140 includes one or more stirrer blades 144 (as independently shown in FIG. 5B) located at the blade end 142a of the stirrer shaft 140, i.e., the lower end of the shaft 142 therein. In particular, the stirrer blades 144 may be supported on a blade body 146, with the stirrer blades 144 extending outwardly from the blade body 146. In an example, the stirrer blades 144 may be provided with an upper angle of 45 degrees and a lower angle of 30 degrees with respect to the longitudinal axis 1' (for example), for aiding introduction of fluid to be agitated/mixed in the glass reaction vessel 110. In some examples, the multiple stirrer blades 144 may be asymmetrically arranged, at the blade end 142*a*, on the stirrer shaft 140 (or the blade body 146). In an example, some of the stirrer blades 144 may be arranged at 45 degrees with respect to the blade body 146, while others may be arranged at 30 degrees with respect to the blade body 146. Such asymmetric arrangement of the multiple stirrer blades 144, or asymmetric relation of the multiple stirrer blades 144 with respect to the shaft 142, helps to create turbulence during mixing operation due to rotation of the shaft 142 (as discussed later) which, in turn, promotes better blending of fluids in the viscous fluid reaction apparatus 100. In some embodiments, the stirrer blades 144 may be tiltable, foldable, or otherwise adjustable so as to permit the stirrer blades and/or the stirrer shaft to be removed from the glass reaction vessel. Such removal may involve passing the stirrer blades through the stirrer opening. The adjustability may permit such passage of blades which are, when in a deployed configuration, wider than the stirrer opening through the stirrer opening. The adjustability may change the orientation of the stirrer blades such that the width in the deployed configuration corresponds to a height or other dimension in a non-deployed configuration. Such adjustability may be advantageous for removing the stirrer blades and/or stirrer shaft from the apparatus, for example for maintenance, replacement, or cleaning, without having to disassemble the apparatus, for example removal of the reaction vessel lid. In some embodiments, this adjustability of the stirrer blades is achieved through the use of an adjustable connection between the stirrer blades and the stirrer shaft. For example, the stirrer blades may be affixed to the stirrer shaft by hinges. Such hinges may allow the stirrer blades to fold in a direction other than a normal turning direction used for stirring. This direction may be, for example, perpendicular to the normal turning direction (e.g. folding to point in a direction parallel to the stirrer shaft), or parallel to but in an opposite direction from the normal turning direction. In some embodiments, this adjustability of the stirrer blades is achieved by fixedly attaching the stirrer blades to a portion of the stirrer shaft which is capable of such adjustment. For example, a hinge may connect an end portion of the stirrer shaft to a main body of the stirrer shaft. This hinge may allow the end portion with the attached stirrer blades to fold such that the stirrer blades are aligned in a direction parallel to the main body of the stirrer shaft. Such a hinge may be lockable to prevent unintentional folding or changes in orientation of the stirrer blades.

FIG. 5C provides a fastener 148, in the form of a screw (with only head being shown in FIG. 5C), to mount the stirrer blades 144, or specifically the blade body 146 of the stirrer blades 144, to the shaft 142. Also, as shown in FIG. 5A, the shaft 142 has an aperture 148*a* formed at the blade end 142*a* (i.e., its lower end). Further, as shown in FIG. 5B, the stirrer blades 144, or specifically the blade body 146 has an aperture 148*b* which may be complementary to the aperture 148*a* in the shaft 142, of the stirrer shaft 140. As shown in FIG. 4, the fastener 148 passes through and engages with the aperture 148*a* in the shaft 142 and the aperture 148*b* in the blade body 146 of the stirrer blades 144 to mount the stirrer blades 144 to the shaft 142, thus completing the stirrer shaft 140.

Further, as shown in FIG. 1, the stirrer shaft 140 passes through the stirrer coupling 134 and the stirrer opening adapter 132 such that the stirrer blade(s) 144 are disposed in the glass reaction vessel 110 at a blade height 'H'. Herein, the blade height 'H' represents a gap or a distance of the stirrer blade(s) 144 from the bottom end 110*b* of the glass reaction vessel 110. E.g., a low blade height would correspond to a small separation distance between the stirrer blade(s) 144 and the bottom end 110*b* of the glass reaction vessel 110. As may be contemplated, the blade height 'H' may be suitably defined for the viscous fluid reaction apparatus 100 depending on the amounts or types of solvent-solute or other mixing parameters, to provide efficient mixing operation in the viscous fluid reaction apparatus 100. For example, efficient mixing of a smaller volume in the apparatus may require a lower blade height than a larger volume in the apparatus or mixing may be most efficient when performed at a blade height which is not at an extreme low end of the volume within the apparatus. In an example, the blade height 'H' may be adjustable in the viscous fluid reaction apparatus 100. For this purpose, the stirrer coupling 134 is a slide coupling configured to allow adjustment of the blade height 'H'. Herein, the stirrer coupling 134 ensures that the stirrer shaft 140 is freely slidable (optionally within limits) along the longitudinal axis 1' when supported thereby. In an example, the stirrer coupling 134 may be provided with internal threads (not shown) complementary to external threads (also not shown) provided on a corresponding portion of the shaft 142 of the stirrer shaft 140, which allows for the linear movement (upwards and downwards) for the stirrer shaft 140 with respect to the stirrer coupling 134 along the longitudinal axis and thereby adjustment of the blade height 'H'. The described and other possible variations of the slide coupling for the stirrer coupling 134 to provide linear movement of the stirrer shaft 140 for adjustment of the blade height 'H' may be contemplated by a person skilled in the art and have not been described in detail herein.

Figure 6:
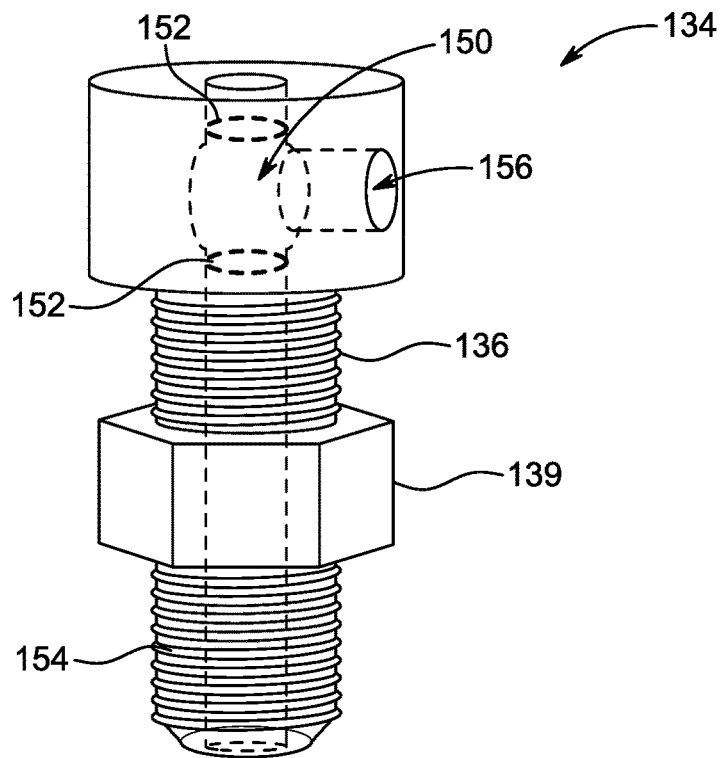
FIG. 6 is a perspective view of a stirrer coupling of the gas-tight stirrer assembly of FIG. 2, according to certain embodiments.

FIG. 6 illustrates a detailed view of the stirrer coupling 134. In an aspect of the present disclosure, the stirrer coupling 134 defines an annular space 150 (as shown in FIG. 2 and FIG. 6) about a portion of the stirrer shaft 140 proximal to the coupling end 142*b* of the stirrer shaft 140 (i.e., proximal to the upper end of the shaft 142). The stirrer shaft 140 passes through the stirrer coupling 134 (as discussed) through the annular space 150 defined therein. The annular space 150 corresponds to the portion of the stirrer coupling 134 which is defined about a portion of the stirrer shaft 140. In an example, the annular space 150 may be cylindrical with a diameter slightly larger than a diameter of the shaft 142 of the stirrer shaft 140. In an example, the annular space may be toroidal in shape. Also, as illustrated, the annular space 150 may be, for example, a bulged out section of the stirrer coupling 134 which corresponding to the portion of the stirrer shaft 140 supported in the stirrer coupling 134. Further, in some examples, the annular space 150 may include an annular space seal 152 which is gas-tight and which allows the stirrer shaft 140 to rotate. The annular space seal 152 ensures that there is no leakage at an interface between the stirrer shaft 140 and the stirrer coupling 134, as will be discussed later in some more detail. In an example, the annular space seal 152 may include one or more O-rings, the O-rings being as described above (also represented by the reference numeral 152). Preferably, these O-rings are perfluoroelastomer O-rings as described above. In the illustrated example, as better shown in FIG. 6, the annular space seal 152 may include two perfluoroeslatomer O-rings 152, one arranged at an upper end of the said bulged section of the annular space 150 and another at a lower end of the said bulged section of the annular space 150, in the stirrer coupling 134. Also, as illustrated, the stirrer shaft seal 136 may include threads 154 (also shown in FIG. 3) formed thereon, onto which the connecting member 139 is engaged, which in turn may help the stirrer coupling 134 to engage with the stirrer opening adapter 132 (as may be seen from FIGS. 1 and 2).

Further, as illustrated in FIG. 2 and FIG. 6, the stirrer coupling 134 may also include a purge gas inlet 156 configured to provide a purge gas to the annular space 150. The purge gas inlet 156 may be defined as an extrusion extending laterally (orthogonal to longitudinal axis 1') in the stirrer coupling 134, proximal to the coupling end 142*b* of the stirrer shaft 140 (i.e., proximal to the upper end of the shaft 142). Also, referring to FIG. 2 and FIG. 4 in combination, the stirrer shaft 140 may further include a purge gas pathway (represented by reference numeral 158). As shown, the purge gas pathway 158 may include a stirrer shaft gas inlet 158*a* located at the portion of the stirrer shaft 140 proximal to the coupling end 142*b* of the stirrer shaft 140, or specifically the upper end of the shaft 142 therein, which is located within the annular space 150 (as discussed in the preceding paragraph). Further, as shown, the purge gas pathway 158 may include a stirrer shaft gas outlet 158*b* located proximal to the blade end 142*a* of the stirrer shaft 140, or specifically the lower end of the shaft 142 therein. In some embodiments, the purge gas pathway 158 defines a generally 'C' shaped channel in the shaft 142 of the stirrer shaft 140, as best shown in FIG. 4. As may be appreciated, the stirrer shaft gas inlet 158*a* is disposed in fluid communication with the purge gas inlet 156, to receive the purge gas provided to the annular space 150, and thereby the purge gas may be transferred to interior of the glass reaction vessel 110 via the stirrer shaft gas outlet 158*b* in the purge gas pathway 158. It may be appreciated that the bulged section of the annular space 150 may help with disposing the stirrer shaft gas inlet 158*a* in fluid communication with the purge gas inlet 156. In an alternate example, the stirrer shaft gas inlet 158*a* may be defined at the coupling end 142*b* of the stirrer shaft 140 without any limitations. As may be appreciated, in such case, the purge gas inlet 156 may not be defined in the stirrer coupling 134. Herein, the received purge gas may help with the reaction process and thereby aid the mixing operation. In some examples, the purge gas pathway 158 may also be utilized to remove gases formed in the glass reaction vessel 110 during the mixing operation, with the purge gas inlet 156 in the stirrer coupling 134 being used as an outlet in fluid communication with the ambient atmosphere.

Figure 7:
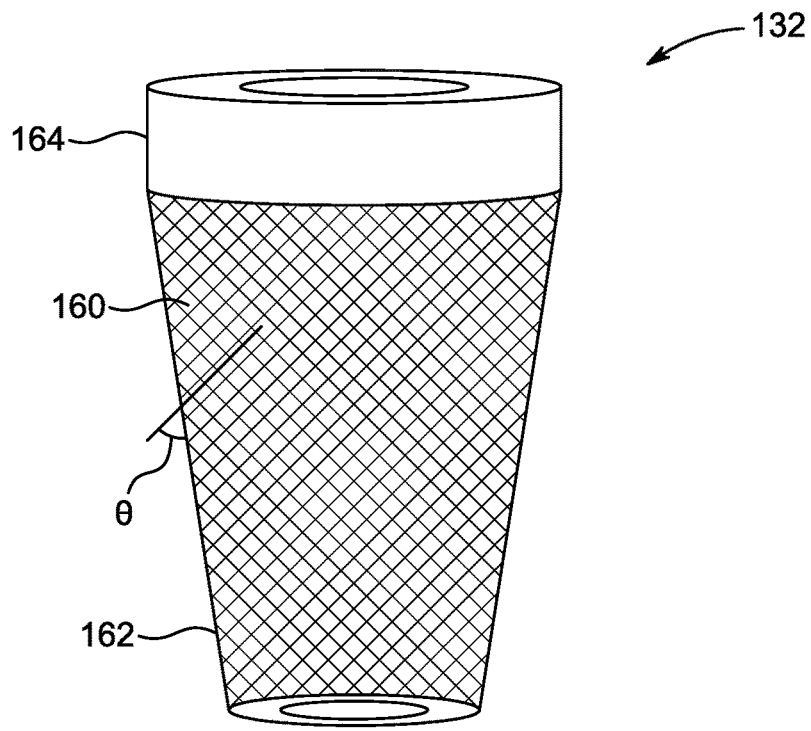
FIG. 7 is a perspective view of a stirrer opening adapter of the gas-tight stirrer assembly of FIG. 2, according to one embodiment.

FIG. 7 illustrates detailed view of the stirrer opening adapter 132, which have been referred to in combination with FIGS. 1-3. In the present examples, the stirrer opening adapter 132 may be made of polytetrafluoroethylene (or PTFE, also known as Teflon), which may help to resist microwave radiation, as well as high heat, high pressure, chemical reactions, etc. from the glass reaction vessel 110. In other examples, the stirrer opening adapter 132 may be made of another suitable polymer, for example polyetheretherketone (PEEK), polyvinyl chloride (PVC), chlorinated polyvinyl chloride (CPVC), high density polyethylene (HDPE), polypropylene, nylon, polyethyleneterephthalate (PET), polyphenylene sulfide (PPS), polysulfone, polycarbonate, and polyvinylidene difluoride (PVDF). In an aspect of the present disclosure, the stirrer opening adapter 132 may include protuberances 160 defined from a periphery (generally represented by reference numeral 162) of the stirrer opening adapter 132. The protuberances 160 may generally be in the form of protrusions extending out from surface of the stirrer opening adapter 132, and may help support (grip) the stirrer opening adapter 132 in the stirrer opening 124 of the glass reaction vessel 110 or may help support, but not interfere with the turning of the stirrer shaft. In some embodiments, the protuberances 160 prevent or mitigate material splashing upwards into the stirrer adapter or stirrer coupling. In the present examples, the protuberances 160 are projecting at a protuberance angle 'θ' inward toward the stirrer shaft 140 and downward toward the stirrer blade(s) 144. In an example, as depicted in FIG. 7, the protuberance angle 'θ' may be defined as an angle of the protuberances 160 with respect to the periphery 162 of the stirrer opening adapter 132. In another example, the protuberance angle 'θ' may be defined as an angle of the periphery 162 of the stirrer opening adapter 132 with respect to the longitudinal axis 1' (also as shown and described in reference to FIG. 1). The downward angle may be advantageous for preventing or mitigating splashing as described above or may facilitate the return of splashed material back to the glass reaction vessel. Herein, the periphery 162 with two opposing inclined planes (as shown) allows the stirrer opening adapter 132 to be tightly inserted into the stirrer opening 124 of the glass reaction vessel 110, and thus support the gas-tight stirrer assembly 130 therein. In the present examples, as shown, the stirrer opening adapter 132 may also include an adapter head portion 164 (also shown in FIG. 2 and FIG. 3) which may generally be a hollow portion (e.g., in the form of a beveled seat) adapted to receive the stirrer shaft seal 136, or at least a portion thereof. Further, as may be seen from FIG. 2, it may be appreciated that the stirrer opening adapter 132 may have the annular space 150 extending along height thereof to provide passage to the shaft 142 of the stirrer shaft 140 therethrough into the glass reaction vessel 110.

Figure 8:
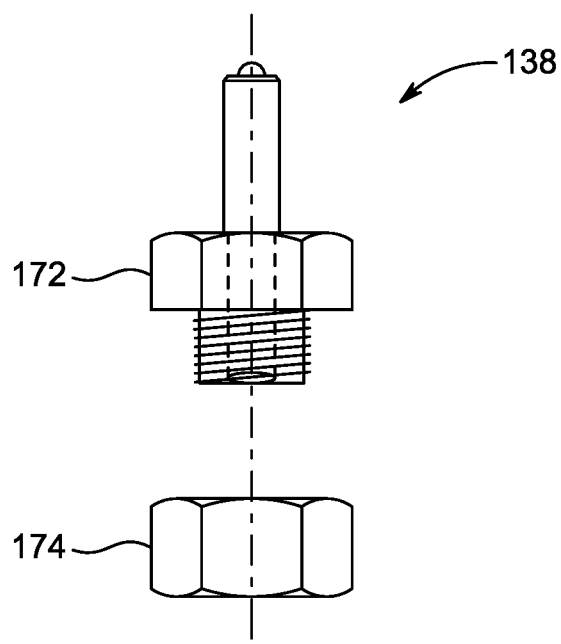
FIG. 8 is an exploded view of a motor coupling of the gas-tight stirrer assembly of FIG. 2, according to certain embodiments.

Referring to FIG. 8, an unassembled view of the motor coupling 138 is illustrated, which has been described in combination with FIG. 1 herein. As shown in FIG. 1, the motor coupling 138 is connected to the stirrer shaft 140. Further, as shown, a motor 170 is connected to the motor coupling 138. Thus, the motor coupling 138 connects the stirrer shaft 140 to the motor 170. As illustrated, the motor coupling 138 may include a coupling adapter 172 and a coupling collar 174 (also shown in FIG. 3). Herein, the coupling collar 174 may be in the form of a nut and may include internal threads (not shown) which may engage with threads in the stirrer shaft 140, or specifically the shaft 142 thereof, at the coupling end 142*b*. This way the motor coupling 138 may couple the stirrer shaft 140 with the coupling adapter 172, and thus the motor 170. The coupling adapter 172 may be adapted to receive an output shaft of the motor 170 therein and thus be able to transfer a rotational output of the motor 170 to the stirrer shaft 140. In the present examples, the stirrer shaft 140 is configured to rotate about a stirrer shaft axis 'R' (as shown in FIG. 1) being driven by the motor 170 without compromising a gas-tight seal formed by the stirrer shaft seal 136. In some examples, the motor coupling 138 may also allow for linear movement (upwards and downwards) of the coupling adapter 172 with respect to the coupling collar 174 along the longitudinal axis 'L' (as shown in FIG. 1), by tightening or loosening connection therebetween, and thus may provide additional (or alternate) mechanism to vary the blade height 'H' (as shown in FIG. 1) of the stirrer shaft 140 in the present viscous fluid reaction apparatus 100.

In an example, the motor 170 may be a varying speed motor as known in the art, to rotate the stirrer shaft 140 at different rotation rates depending on the types of solvent-solute or other mixing parameters, to provide efficient mixing operation in the viscous fluid reaction apparatus 100. In an aspect of the present disclosure, the motor 170 is configured to turn (rotate) the stirrer shaft 140 at a rotation rate of 0 to 2500 rpm. In particular, the motor 170 may turn (rotate) the stirrer shaft 140 at a rotation rate of 1000 to 2000 rpm. Preferably, the motor 170 may rotate the stirrer shaft 140 at a rotation rate of 1500 rpm. In some examples, the O-rings 137 in the stirrer shaft seal 136 and the O-rings 152 in the stirrer coupling 134 may optionally be lubricated by a suitable lubricant, for example anti-friction silicon grease, for allowing uninterrupted rotation of the stirrer shaft 140 therein. Further, the O-rings 137 and the O-rings 152 may be made of materials with high wear and corrosion resistance for the said purpose. Examples of such material include carbon, cemented carbide, sapphire, ceramics and the like. It may be appreciated that such material may be selected depending on the characteristics, such as temperature, of the fluid to be stirred in the viscous fluid reaction apparatus 100.

With such configuration, the present viscous fluid reaction apparatus 100 is capable of stirring a fluid contained within the apparatus 100 (i.e., the glass reaction vessel 110) having a viscosity of 0.01 to 10,000 cP (centipoise), preferably 0.05 to 7,500 cP, preferably 0.1 to 5,000 cP, preferably 1 to 1,000 cP at a rate of 0 to 2500 rpm (rotations per minute). Further, the present viscous fluid reaction apparatus 100 is configured to withstand a pressure differential of up to 0.5-5 bar compared to ambient atmospheric pressure. This makes the present viscous fluid reaction apparatus 100 suitable for carrying out reactions involving highly viscous liquids and reactants. In general, the present viscous fluid reaction apparatus 100 may allow for agitating high glass transition polymer with salts halides additives in polar or dipolar aprotic solvents, withstanding strong acid solvents and strong base solutions, with high reliability under condition of high temperature up to 350° C. and high pressure at about 5 bars. It may be appreciated that the given values of different configurations for the present viscous fluid reaction apparatus 100 are exemplary only, and shall not be construed as limiting to the present disclosure in any manner.

Referring back to FIG. 1, as illustrated, the viscous fluid reaction apparatus 100 may further include a gas-tight inlet assembly 180. As shown, the gas-tight inlet assembly 180 is disposed in the inlet 120 of the glass reaction vessel 110. Also, as shown, the viscous fluid reaction apparatus 100 may include an inert gas inlet 182 connected to the gas-tight inlet assembly 180. In particular, the inert gas inlet 182 may be in the form of an opening defined in the gas-tight inlet assembly 180. The inert gas inlet 182 may allow to provide an inert gas or some other suitable gas (as required) which may promote or aid the mixing operation being performed in the viscous fluid reaction apparatus 100. For this purpose, the inert gas inlet 182 may be disposed in fluid communication with gas source (not shown) to receive the inert as or the like, or otherwise may be closed by using a stopper or the like (as shown). In some examples, the viscous fluid reaction apparatus 100 may further include a temperature probe 184 which is configured to pass through the gas-tight inlet assembly 180, via the inlet 120 into the glass reaction vessel 110, such that the temperature probe 184 measures the temperature of a viscous fluid contained within the viscous fluid reaction apparatus 100 (i.e., inside the glass reaction vessel 110). In other examples, some other type of measuring equipment or the like may be provided through the gas-tight inlet assembly 180, as may be required for monitoring or even supporting the mixing operation in the viscous fluid reaction apparatus 100.

Figure 9A:
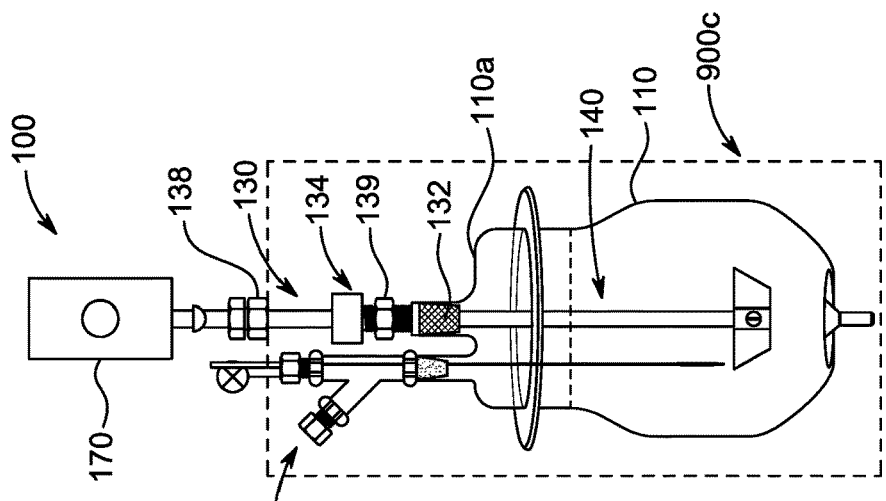
FIG. 9A is a diagrammatic view of the viscous fluid reaction apparatus defining a microwave reaction zone, according to one embodiment.
Figure 9B:
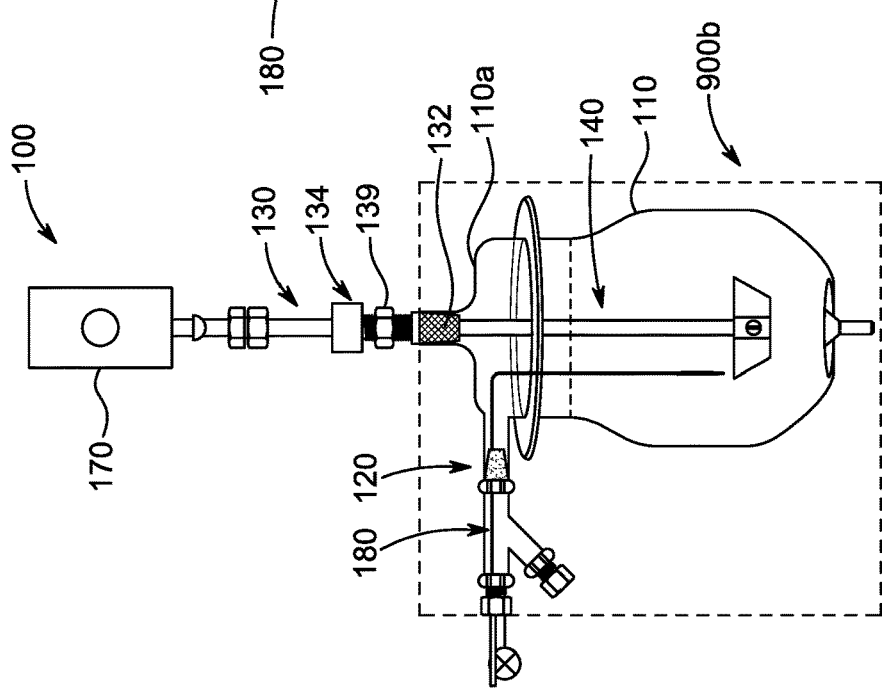
FIG. 9B is a diagrammatic view of the viscous fluid reaction apparatus defining a microwave reaction zone, according to another embodiment.
Figure 9C:
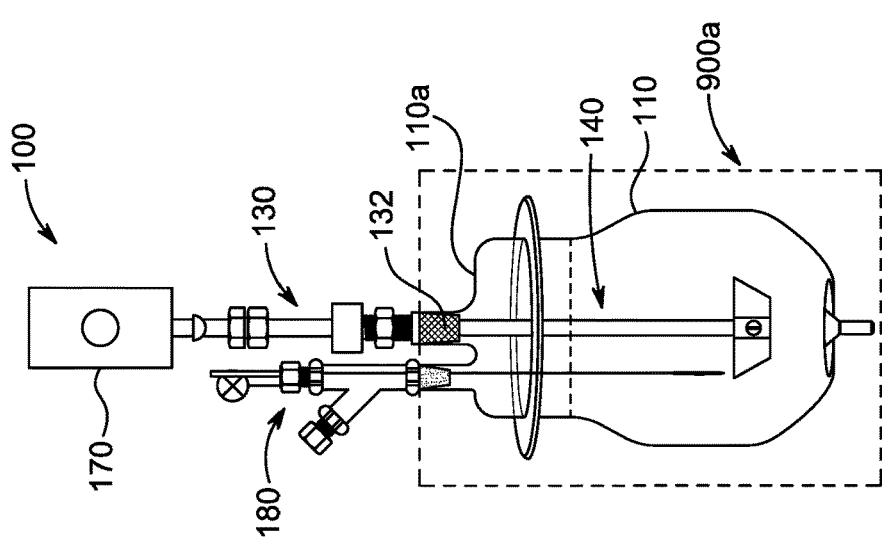
FIG. 9C is a diagrammatic view of the viscous fluid reaction apparatus defining a microwave reaction zone, according to yet another embodiment.

As discussed, the present viscous fluid reaction apparatus 100 is suitable for microwave-based closed heating system. Referring to FIGS. 9A-9C, the viscous fluid reaction apparatus 100 is defined by a microwave reaction zone 900a, 900b, 900c, according to aspects of the present disclosure. In general, the microwave reaction zone 900a, 900b, 900c defines volume or portion of the viscous fluid reaction apparatus 100 which is compatible to be subjected to microwave radiation. In an aspect, the microwave reaction zone 900a, 900b, 900c is substantially free of metal components. In another aspect, the microwave reaction zone 900a, 900b, 900c is devoid of metal components. Further, the viscous fluid reaction apparatus 100 may include a microwave heater (not shown) which is configured to provide microwave radiation to the microwave reaction zone 900a, 900b, 900c without providing substantial microwave radiation to another portion of the viscous fluid reaction apparatus 100. In general, the microwave heater may have the same shape and volume as the microwave reaction zone 900a, 900b, 900c of the corresponding viscous fluid reaction apparatus 100. This ensures that only those components of the viscous fluid reaction apparatus 100 which are rated for safe exposure to the microwave radiation are exposed to the same by the microwave heater.

Herein, FIGS. 9A-9C provide different configurations for the microwave reaction zone 900a, 900b, 900c possible for the present viscous fluid reaction apparatus 100. In configuration of FIG. 9A, the microwave reaction zone 900a is shown to be extending almost only up to the top end 110a of the glass reaction vessel 110. Thus, the microwave reaction zone 900a may only include, in addition to the glass reaction vessel 110, a portion of the stirrer shaft 140 with the stirrer blades 144. In the present examples, the stirrer shaft 140 and the one or more stirrer blades 144 are constructed of a polymer as described above. This is done so as to make these components metal-free, and thus suitable to be part of the microwave reaction zone 900a. In an example, the polymer is polytetrafluoroethylene which is known to be safe against exposure to microwave radiation. In configuration of FIG. 9B, the microwave reaction zone 900b is shown to include the gas-tight inlet assembly 180. Herein, the gas-tight inlet assembly 180 is shown to be bent (compared to configuration of FIG. 1 or FIG. 9A), i.e., horizontally or laterally extending, so as to be accommodated in the microwave reaction zone 900b. In configuration of FIG. 9C, the microwave reaction zone 900c is shown to be comparatively larger in comparison to configuration of the microwave reaction zone 900a of FIG. 9A, to incorporate additional components of the gas-tight stirrer assembly 130 including the stirrer coupling 134.

It may be appreciated that mixing of materials is a mid-constituent to numerous processes in industrial chemical processes as well as in many laboratory procedures. Often microwave-assisted materials dissolution inside a closed heating system is required, complemented with high-speed stirring to allow for simultaneous heating and mixing for increased efficiency. Stirring with heating is known to improve dissolving and mixing, and may also permit preparation of super-saturated solutions. This is especially the case with thermoplastic polymer resins dissolution in strong solvent under microwave irradiation, where high speed stirrer is required for polymer resins dissociating in the solvent. Traditionally, the mixing operation involves sealing the fluids in quartz glass and microwave supported magnetic stirrer for obtaining such conditions, but still such processes may only be suitable for powder form material, such as liquid-liquid or low viscosity based solid liquid. For high viscosity solutions, such as polyether-sulfone dissolution with lithium halide additives in aprotic solvents, which requires microwave assistance, the said traditional processes may not be applicable; and herein the present viscous fluid reaction apparatus 100 may provide an option otherwise not economically feasible with traditional stirrers. The present viscous fluid reaction apparatus 100 is suitable for microwave-based closed heating system by defining suitable microwave reaction zone 900a, 900b, 900c. The viscous fluid reaction apparatus 100 of the present disclosure also allows for purging of blended mixture with inert gas without creating ambient air entertainment into blended mixture, making it suitable for carrying out reactions involving highly viscous liquids and reactants that are especially sensitive to atmospheric moisture. The present viscous fluid reaction apparatus 100 further allows for dissolution and blending of materials for both acid and alkali solvent or solution, and has a high stirring efficiency at low-high rotation speed with low power consumption, and further can be easily washed and maintained due to its easy disassembly procedure.

The embodiment of the present disclosure is illustrated with respect to FIG. 1 through FIG. 9C. The embodiment describes the viscous fluid reaction apparatus 100, comprising the glass reaction vessel 110 comprising the inlet 120, the outlet 122, and the stirrer opening 124; the gas-tight inlet assembly 180 disposed in the inlet 120; and the gas-tight stirrer assembly 130, the portion of which is disposed in the stirrer opening 124, the gas-tight stirrer assembly 130 comprising: the stirrer opening adapter 132 disposed in and configured to interface with the stirrer opening 124, the stirrer coupling 134 comprising the stirrer shaft seal 136 connected to the stirrer opening adapter 132, the stirrer shaft 140 comprising one or more stirrer blades 144 located at the blade end 142a of the stirrer shaft 140, the motor coupling 138 connected to the stirrer shaft 140, and the motor 170 connected to the motor coupling 138, wherein the stirrer shaft 140 passes through the stirrer coupling 134 and the stirrer opening adapter 132 such that the stirrer blade(s) 144 are disposed in the glass reaction vessel 110 at the blade height 'H' and the stirrer shaft 140 is configured to rotate about the stirrer shaft axis 'R' being driven by the motor 170 without compromising the gas-tight seal formed by the stirrer shaft seal 136.

The viscous fluid reaction apparatus 100, wherein the glass reaction vessel 110 is borosilicate glass or quartz.

The viscous fluid reaction apparatus 100, wherein the glass reaction vessel 110 comprises the reaction vessel body 112, the reaction vessel lid 114, and optionally comprising the reaction vessel gasket 116 disposed between the reaction vessel body 112 and the reaction vessel lid 114.

The viscous fluid reaction apparatus 100, wherein the viscous fluid reaction apparatus 100 is defined by the microwave reaction zone 900a, 900b, 900c which is substantially free of metal components.

The viscous fluid reaction apparatus 100, wherein the microwave reaction zone 900a, 900b, 900c is devoid of metal components.

The viscous fluid reaction apparatus 100, wherein the stirrer shaft 140 and the one or more stirrer blades 144 are constructed of the polymer.

The viscous fluid reaction apparatus 100, wherein the polymer is polytetrafluoroethylene.

The viscous fluid reaction apparatus 100, wherein the stirrer shaft seal 136 comprises one or more perfluoroeslatomer O-rings.

The viscous fluid reaction apparatus 100, wherein the stirrer opening adapter 132 comprises protuberances 160 defined from the periphery 162 of the stirrer opening adapter 132 and projecting at the protuberance angle 'θ' inward toward the stirrer shaft 140 and downward toward the stirrer blade(s) 144.

The viscous fluid reaction apparatus 100, wherein the stirrer coupling 134 is the slide coupling configured to allow adjustment of the blade height 'H'.

The viscous fluid reaction apparatus 100, further comprising the inert gas inlet 182 connected to the gas-tight inlet assembly 180.

The viscous fluid reaction apparatus 100, further comprising the temperature probe 184 which is configured to pass through the gas-tight inlet assembly 180 such that the temperature probe 184 measures the temperature of the viscous fluid contained within the viscous fluid reaction apparatus 100.

The viscous fluid reaction apparatus 100, wherein the motor 170 is configured to turn the stirrer shaft 140 at the rotation rate of 0 to 2500 rpm.

The viscous fluid reaction apparatus 100, which is configured to withstand the pressure differential of up to 5 bar compared to ambient atmospheric pressure.

The viscous fluid reaction apparatus 100, wherein the stirrer coupling 134 defines the annular space 150 about the portion of the stirrer shaft 140 proximal to the coupling end 142b of the stirrer shaft 140, the annular space 150 comprising the annular space seal 152 which is gas-tight and which allows the stirrer shaft 140 to rotate.

The viscous fluid reaction apparatus 100, wherein the annular space seal 152 comprises one or more perfluoroeslatomer O-rings.

The viscous fluid reaction apparatus 100, wherein the stirrer coupling 134 further comprises the purge gas inlet 156 configured to provide the purge gas to the annular space 150. The viscous fluid reaction apparatus 100, wherein the stirrer shaft 140 comprises the purge gas pathway 158 comprising the stirrer shaft gas inlet 158a located at the portion of the stirrer shaft 140 proximal to the coupling end 142b of the stirrer shaft 140 which is located within the annular space 150 and the stirrer shaft gas outlet 158b located proximal to the blade end 142a of the stirrer shaft 140.

The viscous fluid reaction apparatus 100 further comprising the microwave heater which is configured to provide microwave radiation to the microwave reaction zone 900a, 900b, 900c without providing substantial microwave radiation to another portion of the viscous fluid reaction apparatus 100.

The viscous fluid reaction apparatus 100, which is capable of stirring the fluid contained within the apparatus 100 having the viscosity of 0.01 to 10,000 cP at the rate of 0 to 2500 rpm.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A viscous fluid reaction apparatus, comprising:
   a glass reaction vessel comprising an inlet, an outlet, and a stirrer opening;
   a gas-tight inlet assembly disposed in the inlet; and
   a gas-tight stirrer assembly, a portion of which is disposed in the stirrer opening, the gas-tight stirrer assembly comprising:

a stirrer opening adapter disposed in and configured to interface with the stirrer opening, a stirrer coupling comprising a stirrer shaft seal connected to the stirrer opening adapter, a stirrer shaft comprising one or more stirrer blades located at a blade end of the stirrer shaft, a motor coupling connected to the stirrer shaft, and a motor connected to the motor coupling, wherein the stirrer shaft passes through the stirrer coupling and the stirrer opening adapter such that the stirrer blade(s) are disposed in the glass reaction vessel at a blade height and the stirrer shaft is configured to rotate about a stirrer shaft axis being driven by the motor without compromising a gas-tight seal formed by the stirrer shaft seal, wherein the stirrer coupling defines an annular space about a portion of the stirrer shaft proximal to a coupling end of the stirrer shaft, wherein the annular space comprises an annular space seal comprising one or more perfluoroeslatomer O-rings that is gas-tight and allows the stirrer shaft to rotate, and wherein the stirrer coupling further comprises a purge gas inlet configured to provide a purge gas to the annular space.

2. The viscous fluid reaction apparatus of claim 1, wherein the glass reaction vessel is borosilicate glass or quartz.

3. The viscous fluid reaction apparatus of claim 1, wherein the glass reaction vessel comprises a reaction vessel body, a reaction vessel lid, and optionally comprising a reaction vessel gasket disposed between the reaction vessel body and the reaction vessel lid.

4. The viscous fluid reaction apparatus of claim 1, wherein the viscous fluid reaction apparatus is defined by a microwave reaction zone which is substantially free of metal components.

5. The viscous fluid reaction apparatus of claim 4, wherein the microwave reaction zone is devoid of metal components.

6. The viscous fluid reaction apparatus of claim 1, wherein the stirrer shaft and the one or more stirrer blades are constructed of a polymer.

7. The viscous fluid reaction apparatus of claim 6, wherein the polymer is polytetrafluoroethylene.

8. The viscous fluid reaction apparatus of claim 1, wherein the stirrer shaft seal comprises one or more perfluoroeslatomer O-rings.

9. The viscous fluid reaction apparatus of claim 1, wherein the stirrer opening adapter comprises protuberances defined from a periphery of the stirrer opening adapter and projecting at a protuberance angle inward toward the stirrer shaft and downward toward the stirrer blade(s).

10. The viscous fluid reaction apparatus of claim 1, wherein the stirrer coupling is a slide coupling configured to allow adjustment of the blade height.

11. The viscous fluid reaction apparatus of claim 1, further comprising an inert gas inlet connected to the gas-tight inlet assembly.

12. The viscous fluid reaction apparatus of claim 1, further comprising a temperature probe which is configured to pass through the gas-tight inlet assembly such that the temperature probe measures the temperature of a viscous fluid contained within the viscous fluid reaction apparatus.

13. The viscous fluid reaction apparatus of claim 1, wherein the motor is configured to turn the stirrer shaft at a rotation rate of 0 to 2500 rpm.

14. The viscous fluid reaction apparatus of claim 1, which is configured to withstand a pressure differential of up to 5 bar compared to ambient atmospheric pressure.

15. The viscous fluid reaction apparatus of claim 1, wherein the stirrer shaft comprises a purge gas pathway comprising a stirrer shaft gas inlet located at the portion of the stirrer shaft proximal to the coupling end of the stirrer shaft which is located within the annular space and a stirrer shaft gas outlet located proximal to the blade end of the stirrer shaft.

16. The viscous fluid reaction apparatus of claim 4 further comprising a microwave heater which is configured to provide microwave radiation to the microwave reaction zone without providing substantial microwave radiation to another portion of the viscous fluid reaction apparatus.

17. The viscous fluid reaction apparatus of claim 1, which is capable of stirring a fluid contained within the apparatus having a viscosity of 0.01 to 10,000 cP at a rate of 0 to 2500 rpm.

* * * * *